United States Patent
Zhadanov et al.

[11] Patent Number: 5,913,327
[45] Date of Patent: Jun. 22, 1999

[54] DEVICE FOR INTRODUCING SUBSTANCES INTO WATER

[76] Inventors: Eli Zhadanov; Sam Zhadanov, both of 2944 W. 5th St., Apt. 20J, Brooklyn, N.Y. 11224

[21] Appl. No.: 08/971,752

[22] Filed: Nov. 17, 1997

[51] Int. Cl.⁶ .............................. E03D 9/03; E03B 11/00; E03B 7/07; F16K 51/00
[52] U.S. Cl. ................... 137/205.5; 137/268; 137/564.5; 137/892; 251/288
[58] Field of Search ................................ 137/205.5, 268, 137/564.5, 892; 251/288

[56] References Cited

U.S. PATENT DOCUMENTS

| | | | |
|---|---|---|---|
| 563,921 | 7/1896 | Gridley | 137/268 |
| 1,085,348 | 1/1914 | Ledoux | 137/205.5 |
| 1,101,574 | 6/1914 | Shephard | 137/205.5 |
| 2,798,767 | 7/1957 | Andrews | 137/268 |
| 2,869,926 | 1/1959 | Lundquist | 137/205.5 |
| 3,003,518 | 10/1961 | Tisdale | 137/268 |
| 3,186,643 | 6/1965 | George et al. | 137/268 |
| 3,192,924 | 7/1965 | Edmondson et al. | 137/205.5 |
| 3,194,444 | 7/1965 | Hubert | 137/205.5 |
| 3,198,438 | 8/1965 | Hultgren | 137/205.5 |
| 3,202,164 | 8/1965 | Thompson et al. | 137/205.5 |
| 3,229,709 | 1/1966 | Gerken | 137/268 |
| 3,349,788 | 10/1967 | Chester | 137/205.5 |
| 3,390,695 | 7/1968 | King et al. | 137/268 |
| 3,439,698 | 4/1969 | De May | 137/268 |
| 4,340,078 | 7/1982 | Pasley | 137/205.5 |
| 4,846,214 | 7/1989 | Strong | 137/205.5 |
| 4,995,418 | 2/1991 | Carvola | 137/268 |
| 5,053,206 | 10/1991 | Maglio et al. | 137/205.5 |
| 5,303,729 | 4/1994 | DeMarco | 137/268 |

FOREIGN PATENT DOCUMENTS 1708628   3/1970   Germany ............................ 137/205.5

*Primary Examiner*—Denise L. Ferensic
*Assistant Examiner*—Joanne Y. Kim
*Attorney, Agent, or Firm*—Ilya Zborovsky

[57] ABSTRACT

A device for introducing substances into water, comprising a water supply element having a throughgoing passage, one end connectable with a water source and another end connectable with a water discharge element so that water passes from the water source through the throughgoing passage to the water discharge element, and a substance supply element having one end connectable with a substance containing element and another end turnably connectable with the water supply element in an open position in which a communication is established between an interior of the substance supply element and the water supply element for supply of a substance from the container through the substance supply element into the water supply element, and a closed position in which the communication is interrupted so that the substance is no longer supplied from the substance supply element into the water supply element.

5 Claims, 2 Drawing Sheets

DEVICE FOR INTRODUCING SUBSTANCES INTO WATER

BACKGROUND OF THE INVENTION

The present invention relates to a device for introducing substances into water.

The devices of the above mentioned general type are known in the art. In known devices a water supply element is used which communicates a water source with a water discharge member formed for example as a shower head and the like, and a substance supply element is connected with the water supply element and in turn is connectable to a substance containing container, so that a substance can be supplied from the container through the substance supply element into said water supply element to mix the substance with water for future use. It is believed that these devices can be further improved.

SUMMARY OF THE INVENTION

Accordingly, it is an object of present invention to provide a device for introducing substances into water, which is a further improvement of the existing device.

In keeping with these objects and with others which will become apparent hereinafter, one feature of present invention resides, briefly stated in a device for introducing substances into water which includes a water supply element provided with a throughgoing opening and having one end connectable with a water source and another end connectable with a water discharge element, and a substance supply element connectable with a substance containing container and turnable relative said water supply element between an open position in which a communication is provided between an interior of the substance supply element and a water supply element and a substance can be supplied from said substance supply element into said water supply element, and a closed position in which said communication is interrupted so that the substance can not be supplied from the substance supply element into said water supply element.

When the device is designed in accordance with the present invention, it can selectively provide a supply of substance into water or interrupt the supply substance in the water, as desired by user.

In accordance with a further advantageous feature of present invention, means are provided for temporarily fixing the substance supply element relative to the water supply element in the open and closed position, and including elongated slots provided on one of the elements and means provided on the other of the elements and extending through said slots, so that in the open position and closed position, the pins abut against opposite ends of said elongated slots.

In accordance with still a further feature of present invention, the substance supply element includes outer engaging formation to be engaged by a user's arm for turning the substance supply element, and the substance supply element is also provided with inner engaging formation for engaging by a neck of the substance containing container.

Finally, in accordance with still another feature of present invention, the substance supply element and the water supply element are provided with openings which are in alignment with one another in the open position and are not in alignment with one another in the close position.

Still in accordance with a further feature of present invention, the substance supply element has a transverse wall and two flanges projecting in opposite directions from said transverse wall, with one sealing element arranged inside one flange for sealing the substance supply element relative to the water supply element, and another sealing element arranged on the other flange for sealing the substance supply element relative to the substance containing container.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
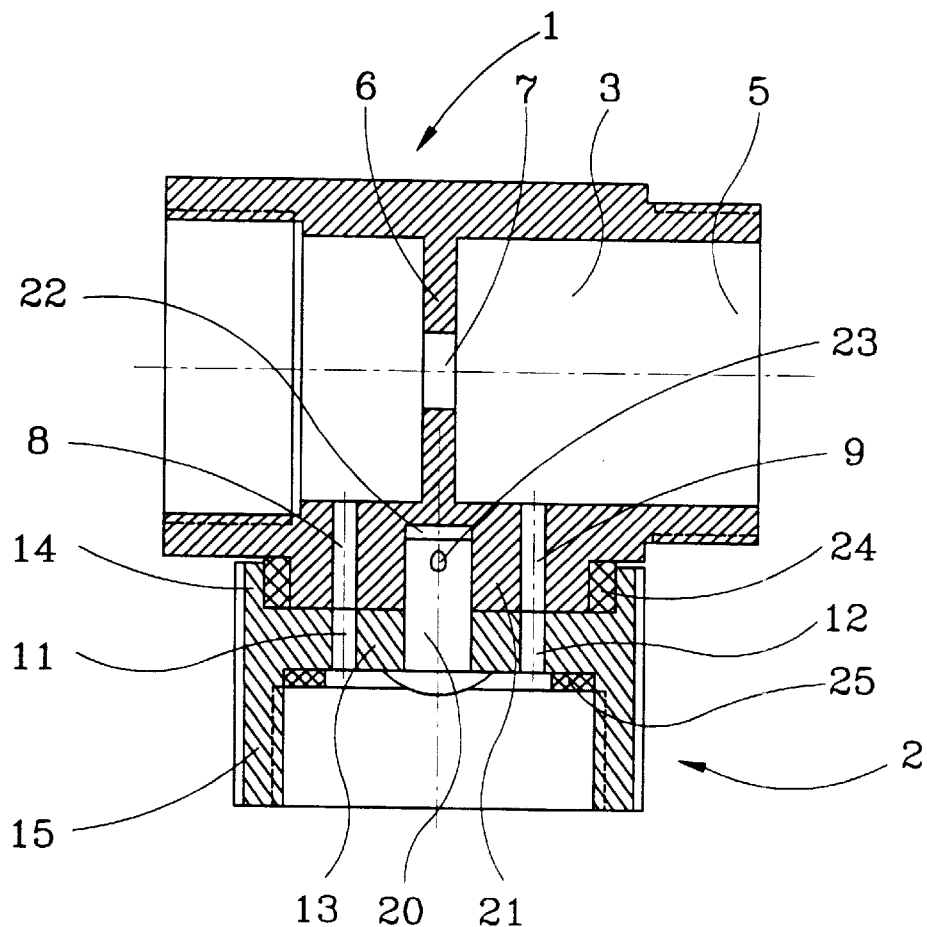
FIG. 1 is a view showing a cross-section of the device for introducing substances into water in accordance with present invention.
Figure 2:
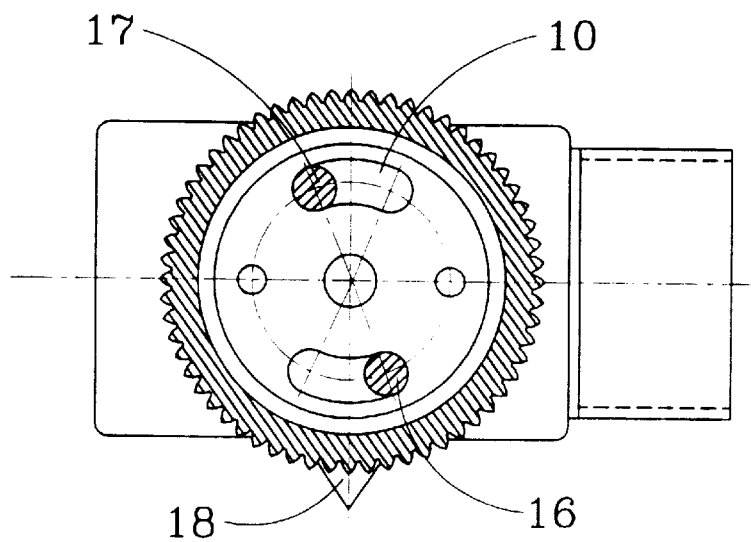
FIG. 2 is a view from below the inventive device.
Figure 3:
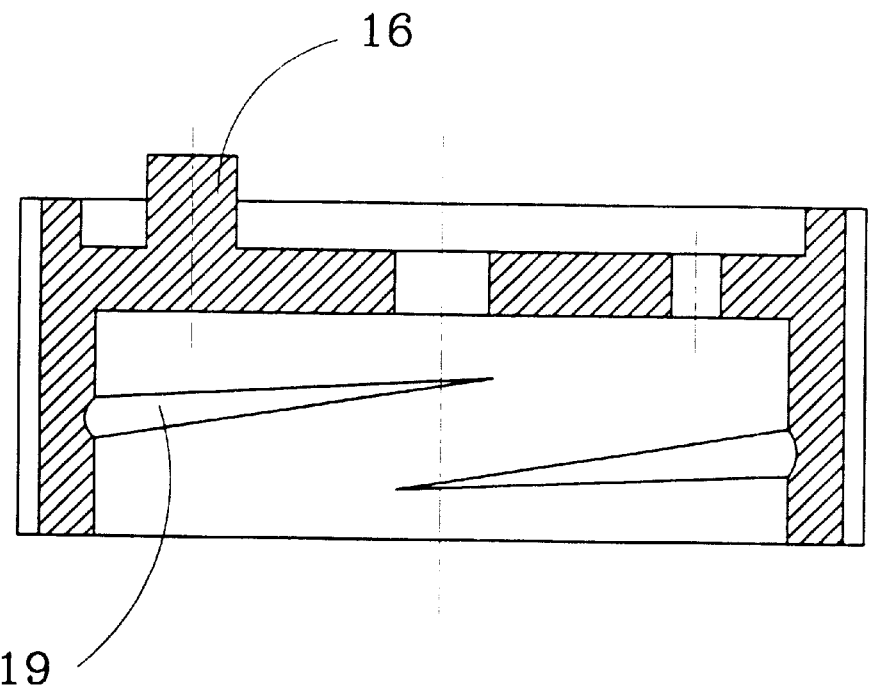
FIG. 3 is a view showing a section taken along the line III—III in FIG. 2.
Figure 4:
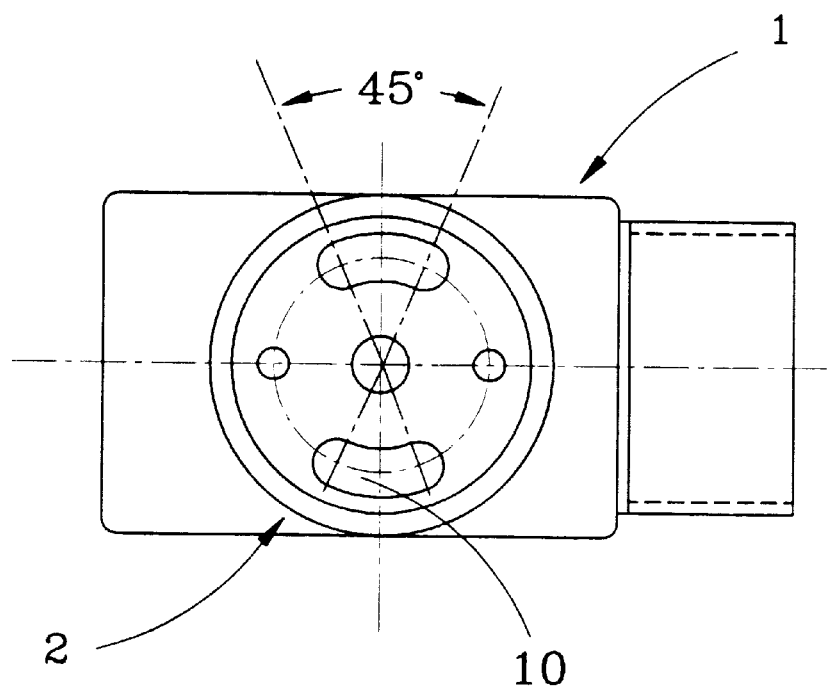
FIG. 4 shows a bottom view of the water supply element.

A device for introducing substances into water includes a water supply element which is identified as a whole with reference numeral 1 and a substance supply element which is identified with reference numeral 2. A water supply element has a throughgoing passage 3, a first end connectable with a source of water such as for example a water pipe by an inner thread and a second end connectable with a water discharge element such as for example a shower head or the like by an outer thread. An intermediate wall 6 is provided in the water supply element and has a narrow opening 7. Therefore, a zone of a reduced pressure is formed in the right part 5 of the throughgoing passage 3 downstream of the opening 7 as considered in direction of flow of water.

The water supply element 1 is further provided with two openings 8 and 9 which communicate the inner passage 3 with an exterior of the element. It is also provided with a flange having two arcuate elongated slots 10.

The substance supply element 2 has two openings 11 and 12 substantially corresponding to the openings 8 and 9 of the water supply element Also, it has a transverse wall 13 and two flanges 14 and 15 extending upwardly and downwardly of the transverse wall 13 as seen in FIG. 1. Two projections 16 and 17 extend from the upper portion of the transverse wall 13 and are inserted in the elongated holes 10 of the water supply element 1. The outer surface of the substance supply element has a plurality of roughening 17 to be easily engaged by a user's fingers. Also, a projection 18 is provided for indication of a corresponding position of the substance supply element relative to the water supply element while the water supply element can be provided with two marks with which the projection 18 coincides in the corresponding open and closed positions. The substance supply element further has an inner formation formed for example as a thread or as one or two convolutions 19 for engagement with a neck of a substance containing container. A pin 20 extends through a central opening 21 of the substance supply element and engages in a blind hole 22 provided in the water supply element. The pin 10 can be provided with outer teeth or outer projections 23 for holding in the hole 22. The pin 21 is a pivot pin for turning the substance supply element relative to the water supply element.

A seal 24 is arranged in the upper flange 14 of the substance supply element for sealing the substance supply element relative to the water supply element, and a seal 25 is located in the inner flange 15 for sealing the substance supply element relative to the neck of the substance containing container.

The device operates in the following manner:

A user grasps the outer rough surface of the substance supply element and turns it to an open position in which the throughgoing openings of the substance supply element coincide with the throughgoing openings of the water supply element. This position is indicated by coincidence of the projection 18 on the substance supply element with the corresponding mark on the water supply element. Water which passes through the inner passage 3 of the water supply element has a reduced pressure in the right part of the passage downstream of the opening 7. A part of water from the left part of the passage 3 flows into the substance containing container through the opening 13 and the substance with water is aspirated from the substance containing container into the right part of the passage 3 through the opening 12 due to the lower pressure in the right part of the passage 3. When it is necessary to use water without addition of the substance, the substance supply element 12 is turned to a closed position in which the throughgoing openings of the substance supply element no longer coincide with the throughgoing openings of the water supply element which is indicated by coincidence of a projection 18 on the substance supply element with the other mark of the water supply element. Thus, the substance is no longer introduced from the substance containing container into the water supply element 1. The closed position and the open position are limited by the abutment of the projections 16 on the substance supply element against end portions of the elongated slots 10 in the water supply element.

It will be understood that each of the elements described above, or two or more together, may also find a useful application in other types of constructions differing from the types described above.

While the invention has been illustrated and described as embodied in a device for introducing substances into water, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for introducing substances into water, comprising a water supply element having a throughgoing passage, one end connectable with a water source and another end connectable with a water discharge element so that water passes from the water source through said throughgoing passage to the water discharge element; and a substance supply element having one end connectable with a substance containing element and another end turnably connectable with said water supply element in an open position in which a communication is established between an interior of said substance supply element and said water supply element for supply of a substance from the container through said substance supply element into said water supply element, and a closed position in which said communication is interrupted so that the substance is no longer supplied from said substance supply element into said water supply element, said substance supply element having a transverse wall and two flanges extending from opposite sides of said transverse wall in direction of said ends of said substance supply element; and further comprising a first sealing element arranged in one of said flanges and sealing said substance supply element relative to said water supply element, and a second sealing element arranged in the other of said flanges and sealing said substance element relative to a part of the substance containing container.

2. A device as defined in claim 1, wherein one of said elements has an elongated slot, while the other of said elements has a projection extending in said slot so as to provide guidance during turning of said substance supply element between said open and closed positions, said slot having end portions forming abutments for said projection in said positions.

3. A device as defined in claim 1, wherein said substance supply element has an outer surface provided with engaging formations to be engaged by user's fingers for turning said substance supply element and inner engaging formations for engagement by a neck of a substance containing container.

4. A device as defined in claim 1; and further comprising a pivot axle about which said substance supply element turns relative to said water supply element, said pivot axle being formed as a pivot pin extending through said substance supply element and engaging in an opening of said water supply element.

5. A device as defined in claim 1; and further comprising means indicating said closed position and said open position and including a projection provided on one of said elements and two marks projecting on the other of said elements and formed so that when said projection coincides with one of said marks one of said positions is indicated, and when said projection coincides with the other of said marks the other of said positions is indicated.

* * * * *